US005328747A

United States Patent [19]

Ide et al.

[11] Patent Number: 5,328,747

[45] Date of Patent: * Jul. 12, 1994

[54] THERMAL IMAGE TRANSFER RECORDING MEDIUM

[75] Inventors: Youji Ide, Mishima; Keiichi Shiokawa, Numazu, both of Japan

[73] Assignee: Ricoh Company, Ltd., Tokyo, Japan

[ * ] Notice: The portion of the term of this patent subsequent to Aug. 24, 2010 has been disclaimed.

[21] Appl. No.: 913,067

[22] Filed: Jul. 14, 1992

Related U.S. Application Data

[63] Continuation of Ser. No. 643,479, Jan. 22, 1991, Pat. No. 5,238,726.

[30] Foreign Application Priority Data

| | | | |
|---|---|---|---|
| Jan. 22, 1990 | [JP] | Japan | 2-12349 |
| Apr. 2, 1990 | [JP] | Japan | 2-87711 |
| Sep. 14, 1990 | [JP] | Japan | 2-244269 |

[51] Int. Cl.[5] ............ B32B 9/00

[52] U.S. Cl. ............ 428/195; 428/212; 428/321.3; 428/484; 428/913; 428/914

[58] Field of Search ............ 428/913, 914, 195, 321.3, 428/212, 484, 488.1, 488.4

[56] References Cited

U.S. PATENT DOCUMENTS

| | | | |
|---|---|---|---|
| 3,413,183 | 11/1968 | Findlay | 428/321.3 |
| 4,624,891 | 11/1986 | Sato | 428/321.3 |
| 4,826,717 | 5/1989 | Kohashi | 428/321.3 |
| 4,857,410 | 8/1989 | Yamahata | 428/321.3 |
| 5,084,330 | 1/1992 | Koshizuka | 428/195 |
| 5,134,019 | 7/1992 | Shiokawa et al. | 428/212 |

*Primary Examiner*—Patrick J. Ryan
*Assistant Examiner*—William A. Krynski
*Attorney, Agent, or Firm*—Oblon, Spivak, McClelland, Maier & Neustadt

[57] ABSTRACT

A thermal image transfer recording medium comprising a support, and a thermofusible ink layer formed thereon, which comprises a resin matrix and a thermofusible ink, with the above resin matrix and the thermofusible ink having a property of repelling each other.

28 Claims, 2 Drawing Sheets

THERMAL IMAGE TRANSFER RECORDING MEDIUM

This is a continuation of application Ser. No. 07/643,479, filed on Jan. 22, 1991, now U.S. Pat. No. 5,238,726, issued Aug. 24, 1993.

BACKGROUND OF THE INVENTION

1. Field of the Invention

This invention relates to a thermal image transfer recording medium which can yield images with high density, with a minimum decrease in the image density even when it is repeatedly used.

2. Discussion of Background

Recording apparatus, such as a printer and a facsimile apparatus, to which the thermal image transfer recording method is applied, are now widely used. This is because the recording apparatus of this type are relatively small in size and can be produced inexpensively, and their maintenance is simple.

In a conventional thermal image transfer recording medium for use with a thermal image transfer recording apparatus, a single ink layer is formed on a support. When such a recording medium is used for printing images, a heated portion of the ink layer, for instance, by a thermal head, is completely transferred to an image receiving sheet by one-time printing only. Therefore, the recording medium can be used only once, and can never be used repeatedly. The conventional recording medium is thus disadvantageous from the economical point of view.

In order to overcome the above drawback in the prior art, there have been proposed the following methods:

(1) A microporous ink layer is formed on a support so that a thermofusible ink impregnated in the ink layer can gradually ooze out, as disclosed in Japanese Laid-Open Patent Applications 54-68253 and 55-105579;

(2) A porous film is provided on an ink layer formed on a support so that the amount of ink which oozes out from the ink layer can be controlled, as disclosed in Japanese Laid-Open Patent Application 58-212993; and (3) A plurality of ink layers are formed on a support, with a plurality of adhesive layers interposed between the ink layers. These ink layers can be exfoliated one by one while images are printed, as disclosed in Japanese Laid-Open Patent Applications 60-127191 and 60-127192.

However, the above three methods have the shortcomings as described below.

When the above method (1) is employed, the ink cannot sufficiently ooze out after the repeated use of the recording medium. As a result, the density of printed images gradually decreases as the number of printing times increases.

As to the method (2), the mechanical strength of the porous film is decreased when the size of the pore included therein is increased in order to increase the image density, and thus the ink layer is apt to peel off the support together with the porous film.

As to the method (3), the amount of the thermofusible ink which is transferred to an image-receiving sheet cannot be uniformly controlled when images are printed.

Furthermore, most of the conventional methods have been developed for use with a serial thermal head for a recording apparatus such as a word processor. Therefore, when those methods are applied to a line thermal head for use in a recording apparatus such as a facsimile apparatus or a bar code printer, problems are brought about, for instance, exfoliation of an ink layer, and decrease in the image density when the recording medium is repeatedly used.

SUMMARY OF THE INVENTION

Accordingly, a first object of the present invention is to provide a thermal image transfer recording medium which can yield images with high density, with a minimum decrease in the image density even when it is repeatedly used.

A second object of this ,invention is to provide a thermal image transfer recording medium which is free from the problems of peeling off and complete transfer of an ink layer to an image-receiving sheet when heated by a thermal head, and can yield high quality images even when it is repeatedly used with a line-type thermal head.

The above-mentioned objects of the present invention can be achieved by any of the following thermal image transfer recording media:

(1) A thermal image transfer recording medium comprising a support, and a thermofusible ink layer formed thereon, which comprises a resin matrix and a thermofusible ink, with the above resin matrix and thermofusible ink having a property of repelling each other;

(2) A thermal image transfer recording medium comprising a support, and a thermofusible ink layer formed thereon, which comprises a microporous resin matrix and a thermofusible ink, with the above resin matrix and thermofusible ink having a property of repelling each other;

(3) A thermal image transfer recording medium comprising a support, and a thermofusible ink layer formed thereon, which comprises a resin matrix and a thermofusible ink, in which the amount of the resin matrix increases in the direction of the thickness of the thermofusible ink layer toward the outer surface thereof, and the amount of the thermofusible ink decreases in the direction of the thickness of the thermofusible ink layer toward the outer surface thereof, with the resin matrix and the thermofusible ink having a property of repelling each other; and (4) A thermal image transfer recording medium comprising a support, and a thermofusible ink layer formed thereon, which comprises a first thermofusible ink layer and a second thermofusible ink layer which is overlaid on the first thermofusible ink layer, in which the first thermofusible ink layer comprises a resin matrix with a three-dimensionally extended, coarsely branched structure and a thermofusible ink, the second thermofusible ink layer comprises a microporous resin matrix and the thermofusible ink, and at least the microporous resin matrix and the thermofusible ink have a property of repelling each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 5:
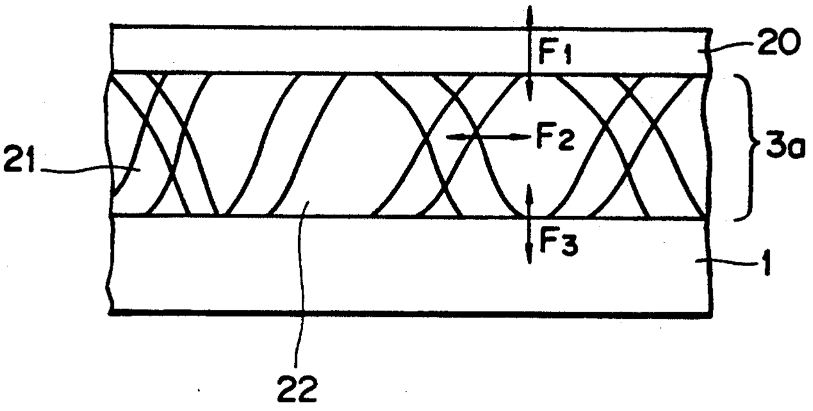
FIG. 5 (PRIOR ART)
FIG. 5 is a schematic diagram in explanation of the complete transfer of a thermofusible ink layer of a conventional thermal image transfer recording medium to an image-receiving sheet.

A conventional thermal image transfer recording medium as shown in FIG. 5 is constructed in such a manner that an ink layer *3a* comprising a thermofusible ink 22 and a resin matrix 21 is formed on a support 1. When thermal image transfer operation is repeated by heating the thermal image transfer recording medium of this kind as shown in FIG. 5 using a line type thermal head, it takes a relatively long time for the thermal image transfer recording medium to be separated from an image-receiving sheet 20 after the application of heat to the recording medium by the thermal head. Thus, in this thermal image transfer, it has been confirmed that the following relationship tends to be established among $F_1$, $F_2$ and $F_3$:

$$F_1 > F_2 \leqq F_3,$$

in which $F_1$ represents the adhesion strength between the thermofusible ink and the image-receiving sheet 20; $F_2$ represents the adhesion strength between the thermofusible ink 22 and the resin matrix 21 in the ink layer *3a;* and $F_3$ represents the adhesion strength of the ink layer *3a* and the support 1. Accordingly, the conventional thermal image transfer recording medium has the shortcoming that the ink layer is completely transferred to the image-receiving sheet by one printing, so that it is impossible to subject the recording medium to the thermal image transfer repeatedly.

In the present invention, it is confirmed that the aforementioned shortcoming can be eliminated when the relationship among $F_1$, $F_2$ and $F_3$ is as follows:

$$F_1 > F_2, \text{ and } F_3 > F_2.$$

To satisfy the above relationship, the thermal image transfer recording medium according to the present invention comprises a support, and a thermofusible ink layer formed thereon, which comprises a resin matrix and a thermofusible ink, with the above resin matrix and thermofusible ink being provided with a property of repelling each other by use of a repelling-property-imparting material as described below.

Specifically in the present invention, a material capable of repelling the thermofusible ink may be physically applied to the resin matrix, or chemically bonded with the resin matrix to form a repelling site thereon. Alternatively, the thermofusible ink may contain a material capable of repelling the resin matrix.

For instance, a low-surface-energy material, such as a modified silicone resin, a silicone resin and a modified fluoroplastic, works to repel the thermofusible ink when contained in the resin matrix of the ink layer of the thermal image transfer recording medium according to the present invention. These low-surface-energy materials can be used alone or in combination.

The aforementioned low-surface-energy material may be mixed with other resins to constitute the resin matrix of the ink layer. This is preferable from the viewpoints of the affinity for the thermofusible ink and the mechanical strength of the ink layer.

The previously mentioned modified silicone resins and modified fluoroplastics can be prepared by any of the conventional methods which are employed in preparation of modified acrylic resin, modified urethane resin, modified alkyd resin and modified epoxy resin. Namely, acrylic resin, urethane resin, alkyd resin or epoxy resin is allowed to react with polyorganosiloxane showing low surface energy, to form a block- or graft-copolymer. Thus, modified silicone resins can be prepared. To prepare the modified fluoroplastics, those resins may be allowed to react with ethylene difluoride, ethylene trifluoride or ethylene tetrafluoride to form a block- or graft-copolymer. When the modified silicone resin or modified fluoroplastic is mixed with the other resins to constitute a resin matrix in the ink layer, it is preferable that the modified resin having a low-surface-energy be present in the vicinity to the surface of the resin matrix.

The most preferable materials capable of repelling the thermofusible ink are modified silicone oils and waxes which comprise polyorganodimethylsiloxane having an epoxy group, carboxylic acid, amine, aziridine or isocianate at an end portion thereof.

Resins having a glass transition temperature higher than the melting point of the thermofusible ink can be used as the resin matrix. For example, vinyl chloride resin, vinyl chloride - vinyl acetate copolymer, polyester resin, epoxy resin, polycarbonate resin, phenolic resin, acrylic resin, urethane resin and polyimide resin can be employed.

In particular, a partially saponified copolymer of vinyl chloride and vinyl acetate and a maleic-acid-containing copolymer of vinyl chloride and vinyl acetate are preferably used as the resin matrix of the ink layer in terms of the glass transition temperature. Furthermore, the adhesion of the obtained ink layer to the support, and the flexibility and the mechanical strength of the obtained ink layer are improved.

The amount of the aforementioned low-surface-energy material which can impart the releasing property to the resin matrix may appropriately be determined with the aggregation force which works within the thermofusible ink taken into consideration.

The present invention will now be explained in detail by referring to a preparation example of a resin matrix capable of repelling the thermofusible ink.

Preparation Example of Resin Matrix for Ink Layer

A commercially available copolymer of vinyl chloride and vinyl acetate containing 2 wt.% of maleic acid, "VMCH" (Trademark), made by Union Carbide Japan K.K., (average molecular weight: 8000 and Tg: 70° C.) and a commercially available polyorganodimethylsiloxane oil having an epoxy group at one end thereof, "X-22-3437" (Trademark), made by Shin-Etsu Chemical Co., Ltd., (epoxy equivalent: 350 and viscosity: 30 cSt.) are mixed at a theoretically equivalent ratio in the presence of a mixed solvent of methyl ethyl ketone and toluene. After the completion of reaction, a resin matrix having a site of repelling a thermofusible ink can be obtained.

A thermofusible ink for use in the ink layer of the present invention, which is capable of repelling the resin matrix, can be prepared by mixing a conventionally known thermofusible ink with a low-surface-energy vehicle such as a modified silicone oil, modified silicone wax and modified fluorine-containing wax. These low-surface-energy vehicles can be used alone or in combination.

Alternatively, the aforementioned low-surface-energy vehicle may be blended with an adequate other vehicle to prepare a thermofusible ink for use in the present invention. This method is more preferable from the viewpoints of dispersion properties of a coloring agent in the thermofusible ink and the thermal characteristics of the obtained thermofusible ink.

In the present invention, any modified silicone waxes and modified silicone oils are usable as far as they can satisfy the characteristics of the thermofusible ink to be employed. The silicone waxes and oils may be modified using a modifying group which can improve the compatibility with the other vehicles. For instance, alcohol-, polyether-, olefin-, amino-, amide-, carboxyl-, fatty acid- and carnauba-modified silicone waxes and oils are preferably employed in the present invention. When the modified silicone wax or oil is used alone as a vehicle for the thermofusible ink, the melting point of such a silicone wax or oil is preferably in the range of 40° to 110° C.

The structure of the thermal image transfer recording medium according to the present invention will now be explained in detail by referring to FIGS. 1 to 4.

Figure 1:
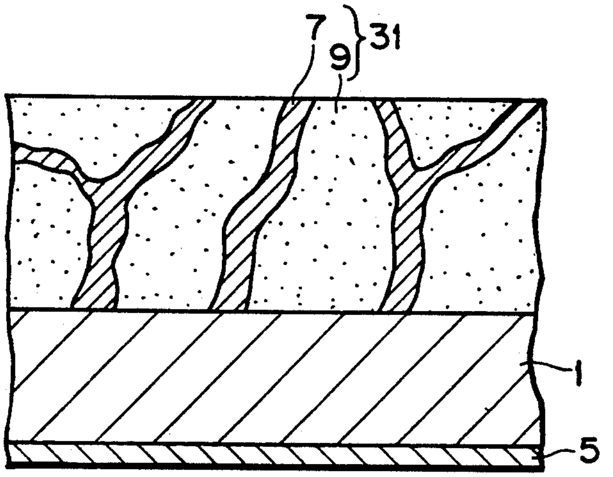
FIGS. 1 to 4 are schematic cross-sectional views of the examples of a thermal image transfer recording medium according to the present invention.

FIG. 1 is a schematic cross-sectional view of a first example of the thermal image transfer recording medium according to the present invention. In FIG. 1, an ink layer 31 comprising a resin matrix 7 and a thermofusible ink 9 is formed on a support 1. In addition to the above basic structure, the support 1 may be provided with a heat-resistant protective layer 5 on its back surface as shown in FIG. 1. In this example, the resin matrix 7 may have a property of repelling the thermofusible ink 9, and vice versa. The weight ratio of the thermofusible ink 9 to the resin matrix 7 in the ink layer 31 may appropriately be determined depending upon the recording conditions in a recording apparatus employed, particularly, how many times the recording medium is supposed to be subjected to image printing. With the prevention of complete transfer of the ink layer 9 to the image-receiving sheet and the optical density of obtained images taken into consideration, it is desirable that the weight ratio of the thermofusible ink 9 to the resin matrix 7 in the ink layer 31 be from about (70:30) to about (40:60).

The thickness of the ink layer 31, which may also be determined depending upon how many times the recording medium is supposed to be subjected to image printing, is preferably in the range of about 5 to 12 μm.

The ink layer 31 as shown in FIG. 1 can be prepared by dispersing the thermofusible ink 9 at approximately 30° C., allowing the dispersion to stand at room temperature to be gelled, mixing the gel with the composition of the resin matrix 7, and coating the mixture onto the support 1.

Conventionally known heat-resistant materials can be used as the materials for the support 1 for use in the present invention. Examples of such materials include a film of plastics such as polyester, polycarbonate, triacetyl cellulose, nylon and polyimide, and a sheet of cellophane, parchment paper and condenser paper.

It is preferable that the thickness of the support 1 be in the range of 2 to 15 μm from viewpoints of thermal sensitivity and mechanical strength.

It is possible to improve the heat resistance of the support 1 by providing, as shown in FIG. 1, a heat-resistant protective layer 5 on the back side of the support 1, which side is brought into contact with a thermal head. Examples of the material for the heat-resistant protective layer 5 are silicone resin, fluoroplastics, polyimide resin, epoxy resin, phenolic resin, melamine resin and nitrocellulose.

The thermofusible ink 9 contained in the ink layer 31 comprises a coloring agent and a wax. As previously mentioned, the thermofusible ink 9 further comprises a material capable of repelling the resin matrix 7 when necessary.

The aforementioned coloring agent of the thermofusible ink 9 can be selected from the conventional pigments and dyes. Of the known pigments, carbon black and phthalocyanine pigments are preferably used. Among the known dyes, direct dyes, acid dyes, basic dyes, dispersible dyes and oil-soluble dyes are preferably used.

Examples of the wax contained in the thermofusible ink 9 include natural waxes such as bees wax, carnauba wax, whale wax, Japan wax, candellila wax, rice bran wax and montan wax; paraffin wax, microcrystalline wax, oxidized wax, ozocerite, ceresine wax and ester wax; higher fatty acids such as margaric acid, lauric acid, myristic acid, palmitic acid, stearic acid, phloionic acid and behenic acid; higher alcohols such as stearyl alcohol and behenyl alcohol; esters such as sorbitan fatty acid ester; and amides such as stearic amide and oleic amide.

Figure 2:
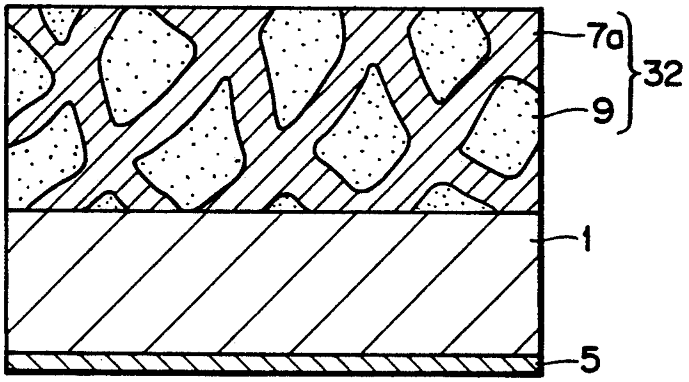

FIG. 2 is a schematic cross-sectional view of a second example of the thermal image transfer recording medium according to the present invention. In FIG. 2, an ink layer 32 comprising a microporous resin *7a* and a thermofusible ink 9 is formed on a support 1. In addition to the above basic structure, the support 1 may be provided with a heat-resistant protective layer 5 on its back surface as shown in FIG. 2. In this example, the microporous resin *7a* may have a property of repelling the thermofusible ink 9, and vice versa. It is preferable that the weight ratio of the thermofusible ink 9 to the microporous resin *7a* in the ink layer 32 be from about (70:30) to about (40:60).

The thickness of the ink layer 32, which may be determined depending upon how many times the recording medium is supposed to be subjected to image printing, is preferably in the range of about 5 to 12 μm.

It is advantageous that the ink layer 32 of FIG. 2 be prepared by coating a mixture of the thermofusible ink 9 and the microporous resin *7a* on the support 1, followed by exposure to the heated air of 50° to 130° C.

Figure 3:
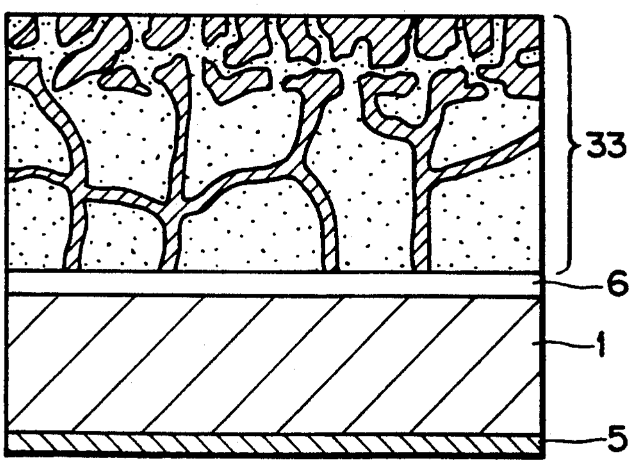

FIG. 3 is a schematic cross-sectional view of a third example of the thermal image transfer recording medium according to the present invention. In FIG. 3, an ink layer 33 comprising a resin matrix and a thermofusible ink is formed on a support 1. In addition to the above basic structure, the support 1 may be provided with a heat-resistant protective layer 5 on its back surface as shown in FIG. 3. Moreover, an adhesive layer 6 may be interposed between the support 1 and the ink layer 33, if necessary.

In this example, the resin matrix may have a property of repelling the thermofusible ink, and vice versa. The ink layer 33 of the recording medium as shown in FIG. 3 is prepared by coating a mixture of the same resin matrix and thermofusible ink as used in the thermal image transfer recording medium of FIG. 1 onto the support 1 and allowing the mixture to stand for about 3 to 10 minutes at a temperature higher than the melting point of the employed thermofusible ink. As shown in FIG. 3, the occupation ratio of the resin matrix in the upper portion of the ink layer 33 is higher than that in the lower portion thereof. This is because the coloring agent contained in the thermofusible ink, such as carbon black, has a high specific gravity, a homogeneously dispersed thermofusible ink tends to descend to the lower portion in the vicinity of the support 1.

The configuration of the ink layer 33 of the recording medium as shown in FIG. 3 is similar to that of an ink layer 34 of FIG. 4, which will be described below. The ink layer 33 of FIG. 3 is necessarily composed of a lower layer portion in the vicinity of the support 1, which portion comprises a thermofusible ink and a resin matrix coarsely extended in the form of a branch, and an upper portion comprising a microporous resin and a thermofusible ink, with the resin matrix in the form of a branch in the lower portion, the microporous resin in the upper portion and the support (or an adhesive layer if provided between the support and the ink layer) being partially connected with each other.

Figure 4:
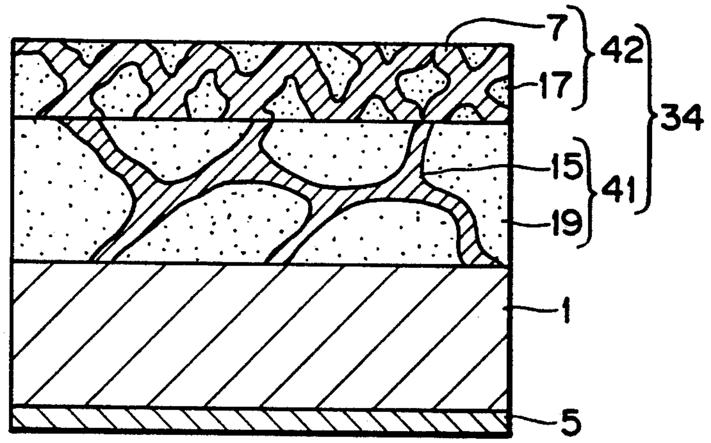

FIG. 4 is a schematic cross-sectional view of a fourth example of the thermal image transfer recording medium according to the present invention. In FIG. 4, a first ink layer 41 comprising a first resin matrix 15 and a first thermofusible ink 19 and a second ink layer 42 comprising a second resin matrix 7 and a second thermofusible ink 17 are successively overlaid on a support 1. In addition to the above basic structure, the support 1 may be provided with a heat-resistant protective layer 5 on its back surface as shown in FIG. 4.

In the first ink layer 41, the thermofusible ink 19 is retained by the resin matrix 15 which is coarsely extended in the form of a branch. The thermofusible ink 19 may have a property of repelling the above resin matrix 15 or not.

In the second ink layer 42 formed on the first ink layer 41, the microporous resin 7 may have a property of repelling the thermofusible ink 17, and vice versa. The thermofusible ink 17 contained in the second ink layer 42 may be the same or different from the thermofusible ink 19 in the first ink layer 41.

The occupation ratio (weight ratio) of the thermofusible ink 19 to the resin matrix 15 in the first ink layer 41 and that of the thermofusible ink 17 to the microporous resin 7 in the second ink layer 42, and the thickness of each ink layer may appropriately be determined depending upon how many times the recording medium is supposed to be subjected to image printing. With the prevention of complete transfer of the ink layer to the image-receiving sheet and the optical density of obtained images taken into consideration, the preferable weight ratio of the thermofusible ink 19 to the resin matrix 15 in the first ink layer 41 is about (190:10) to (60:40), and that of the thermofusible ink 17 to the microporous resin 7 in the second ink layer 42, about (80:20) to (40:60). It is preferable that the thickness of the first ink layer 41 be in the range of 4 to 10 μm, and that of the second ink layer 42, in the range of 1 to 5 μm.

It is advantageous that the first ink layer 41 and the second ink layer 42 of FIG. 4 be separately prepared by coating a first mixture of the thermofusible ink and the resin and a second mixture of the thermofusible ink and the resin, respectively on the support 1 and the first ink layer, followed by exposure to the heated air of 50° to 130° C.

In order to obtain the desired ink layer, it is preferable to incorporate a blowing agent into the first mixture and the second mixture. As the blowing agent for use in the present invention, azo compounds are preferably used, because they are decomposed under application of heat thereto to form pores in the whole layer. Examples of the above azo compounds are azodicarbonamide, azobisisobutyronitrile, azocyclohexylnitrile, diazoaminobenzene and barium azodicarboxylate.

The amount of the blowing agent is not specifically limited. However, the preferred amount of the blowing agent is 1 to 30 wt.% of the total weight of the solid content of the layer to be formed, with the ink transferring efficiency and the mechanical strength of the layer taken into consideration.

A blowing accelerating agent such as zinc oxide, a stearate and a palmitate, or a plasticizer such as dioctyl phthalate may be further added, if necessary, to control the expansion temperature and the expansion efficiency.

Instead of using such blowing agents, the desired ink layer can also be formed by using a mixed solvent of a high-volatile solvent and a non-volatile solvent. Namely, the ink layer 32 of FIG. 2 and the first ink layer 41 and the second ink layer 42 of FIG. 4 can be formed by dissolving the resin and the thermofusible ink into the above-mentioned mixed solvent, coating the thus prepared mixture and drying it. The thus prepared layer has a porous structure.

As shown in FIG. 3, the adhesive layer 6 may be interposed between the ink layer and the support in the present invention. Owing to this adhesive layer, the ink layer can be firmly fixed on the support.

Examples of materials for the adhesive layer include ethylene - vinyl acetate copolymer, vinyl chloride - vinyl acetate copolymer, ethylene - acrylate copolymer, polyethylene, polyamide, polyester, petroleum resins and nylon. These materials can be used alone or in combination.

The thickness of the adhesive layer is preferably 0.2 to 2.0 μm from the viewpoints of adhesiveness and thermal sensitivity.

Other features of this invention will become apparent in the course of the following description of exemplary embodiments, which are given for illustration of the invention and are not to intended to be limiting thereof.

EXAMPLE 1

One surface of a polyethylene terephthalate film with a thickness of 4.5 μm was coated with a silicone resin, thereby obtaining a support provided with a heat-resistant protective layer.

Formation of Ink Layer

The following components were thoroughly dispersed in a ball mill at 30° C., and allowed to stand at room temperature, so that a composition for a thermofusible ink was prepared.

| | Parts by Weight |
|---|---|
| Carbon black | 2.5 |
| Candelilla wax | 7.6 |
| Polyethylene oxide | 2.5 |
| Terpene resin | 1.4 |
| Methyl ethyl ketone | 58.0 |
| Toluene | 28.0 |

Polyorganosiloxane having approx. 180 to 200 repeat units of SiO was grafted into an acrylic acid monomer, and a product thus obtained and methyl methacrylate were subjected to copolymerization reaction, so that an acryl-modified silicone resin with an average molecular weight of about 40,000, having the following formula, was obtained:

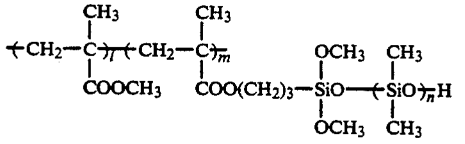

l:m = 70:30 by weight ratio, n = 180~200

The above-prepared acryl-modified silicone resin was dissolved in methyl ethyl ketone at a concentration of 20%, whereby a composition for a resin matrix was prepared.

The composition of the thermofusible ink and that of the resin matrix were mixed at a weight ratio of 6:4, and the thus obtained mixture was coated onto the above-prepared support on a side opposite to the heat-resistant protective layer, and dried, so that an ink layer with a thickness of about 10 μm was formed on the support. Thus, a thermal image transfer recording medium No. 1 according to the present invention with a structure as shown in FIG. 1 was obtained.

EXAMPLE 2

A support provided with a heat-resistant protective layer was prepared by the same method as in Example 1.

A composition for a thermofusible ink contained in an ink layer was prepared in the same manner as employed in Example 1.

Polytetrafluoroethylene having approx. 15 to 20 repeat units was grafted into an acrylic acid monomer, and a product thus obtained and methyl methacrylate were subjected to copolymerization reaction, so that an acryl-modified fluoroplastic with an average molecular weight of about 35,000 was obtained.

The above-prepared acryl-modified fluoroplastic was dissolved in a mixed solvent of isopropyl alcohol and methyl ethyl ketone (1:1 by weight ratio) at a concentration of 20% whereby a composition for a resin matrix was prepared The composition for the thermofusible ink and that of the resin matrix were mixed at a weight ratio of 6:4, and the thus obtained mixture was coated onto a surface of the above-prepared support, which was opposite to the heat-resistant protective layer, and dried, so that an ink layer with a thickness of about 10 μm was formed on the support. Thus, a thermal image transfer recording medium No. 2 according to the present invention with a structure as shown in FIG. 1 was obtained.

EXAMPLE 3

A support provided with a heat-resistant protective layer was prepared by the same method as in Example 1.

A composition for a thermofusible ink contained in an ink layer was prepared in the same manner as employed in Example 1.

Polyorganosiloxane having aprox. 20 to 40 repeat units of SiO was grafted into an acrylic acid monomer, and a product thus obtained and methyl methacrylate were subjected to copolymerization reaction, so that an acryl-modified silicone resin with an average molecular weight of about 15,000 was obtained.

Five parts by weight of the thus obtained acryl-modified silicone resin and 95 parts by weight of vinyl chloride - vinyl acetate copolymer were dissolved in a mixed solvent of methyl ethyl ketone and toluene (7:3 by weight ratio) at a concentration of 20%, whereby a composition for a resin matrix was prepared.

The composition of the thermofusible ink and that of the resin matrix were mixed at a weight ratio of 6:4, and the thus obtained mixture was coated onto a surface of the above-prepared support on a side opposite to the heat-resistant protective layer, and dried, so that an ink layer with a thickness of about 10 μm was formed on the support. Thus, a thermal image transfer recording medium No. 3 according to the present invention with a structure as shown in FIG. 1 was obtained.

EXAMPLE 4

A support provided with a heat-resistant protective layer was prepared by the same method as in Example 1.

A composition of a thermofusible ink contained in an ink layer was prepared in the same manner as employed in Example 1.

A composition of a resin matrix contained in the ink layer was prepared in the same manner as in previously mentioned Preparation Example. The thus obtained composition of the resin matrix was dissolved in a mixed solvent of methyl ethyl ketone and toluene (7:3 by weight ratio) at a concentration of 20%, whereby a composition for a resin matrix was prepared.

The composition for the thermofusible ink and that of the resin matrix were mixed at a weight ratio of 6:4, and the thus obtained mixture was coated onto the above-prepared support on a side opposite to the heat-resistant protective layer, and dried at 110° C., so that an ink layer with a thickness of about 8 μm was formed on the support. Thus, a thermal image transfer recording medium No. 4 according to the present invention with a structure as shown in FIG. 1 was obtained.

EXAMPLE 5

A support provided with a heat-resistant protective layer was prepared by the same method as in Example 1.

Formation of Ink Layer

The following components were thoroughly dispersed in a ball mill at 30° C., and allowed to stand at room temperature, so that a composition for a thermofusible ink was prepared.

| | Parts by Weight |
|---|---|
| Carbon black | 2.5 |
| Candelilla wax | 6.8 |
| Polyethylene oxide wax | 1.9 |
| Fatty acid-modified silicone oil, "X-22-800" (Trademark) made by Shin-Etsu Chemical Co., Ltd. | 1.4 |
| Terpene resin | 1.4 |
| Methyl ethyl ketone | 58.0 |
| Toluene | 28.0 |

A copolymer of vinyl chloride and vinyl acetate with an average molecular weight of 20,000 was dissolved in methyl ethyl ketone at a concentration of 20%, whereby a composition of a microporous resin was prepared.

The composition of the thermofusible ink and that of the microporous resin were mixed at a weight ratio of 6:4, and the thus obtained mixture was coated onto the above-prepared support on a side opposite to the heat-resistant protective layer, and dried, so that an ink layer with a thickness of about 10 μm was formed on the support. Thus, a thermal image transfer recording medium No. 5 according to the present invention with a structure as shown in FIG. 2 was obtained.

EXAMPLE 6

The procedure for preparation of the thermal image transfer recording medium No. 5 employed in Example 5 was repeated except that the fatty acid-modified silicone oil "X-22-800" (Trademark) made by Shin-Etsu Chemical Co., Ltd., in the composition of the thermofusible ink was replaced by a commercially available alcohol-modified silicone oil, "X-22-801" (Trademark) made by Shin-Etsu Chemical Co., Ltd. Thus, a thermal image transfer recording medium No. 6 according to the present invention with a structure as shown in FIG. 2 was obtained.

EXAMPLE 7

The procedure for preparation of the thermal image transfer recording medium No. 5 employed in Example 5 was repeated except that the fatty acid-modified silicone oil "X-22-800" (Trademark) made by Shin-Etsu Chemical Co., Ltd., in the composition of the thermofusible ink was replaced by a commercially available amide-modified silicone oil, "KF3995" (Trademark) made by Shin-Etsu Chemical Co., Ltd. Thus, a thermal image transfer recording medium No. 7 according to the present invention with a structure as shown in FIG. 2 was obtained.

EXAMPLE 8

A support provided with a heat-resistant protective layer was prepared by the same method as in Example 1.

Formation of Ink Layer

The following components were thoroughly dispersed in a ball mill at 30° C. and allowed to stand at room temperature so that a composition of a thermofusible ink was prepared.

| | Parts by Weight |
|---|---|
| Carbon black | 2.5 |
| Carnauba wax | 3.4 |
| Candelilla wax | 3.4 |
| Polyethylene oxide wax | 1.9 |
| Carnauba-modified silicone oil, "X-22-3500" (Trademark) made by Shin-Etsu Chemical Co., Ltd. | 1.4 |
| Terpene resin | 1.4 |
| Methyl ethyl ketone | 58.0 |
| Toluene | 28.0 |

A copolymer of vinyl chloride and vinyl acetate with an average molecular weight of 20,000 was dissolved in methyl ethyl ketone at a concentration of 20%, whereby a composition of a microporous resin was prepared.

The composition of the thermofusible ink and that of the microporous resin were mixed at a weight ratio of 6:4, and the thus obtained mixture was coated onto a surface of the above-prepared support, which was opposite to the heat-resistant protective layer, and dried, so that an ink layer with a thickness of about 10 μm was formed on the support. Thus, a thermal image transfer recording medium No. 8 according to the present invention with a structure as shown in FIG. 2 was obtained.

EXAMPLE 9

A support provided with a heat-resistant protective layer was prepared by the same method as in Example 1.

Formation of First Ink Layer

A mixture of 80 parts by weight of the same composition of the thermofusible ink as in Example 4 and 20 parts by weight of vinyl chloride - vinyl acetate copolymer was coated onto a surface of the above-prepared support, which was opposite to the heat-resistant protective layer and dried, so that a first ink layer with a thickness of about 8 μm was formed on the support.

Formation of Second Ink Layer

A mixture of 70 parts by weight of the same composition of the thermofusible ink as used in Example 4 and 30 parts by weight of the same composition of the microporous resin as in Example 5 was coated onto the above-prepared first ink layer and dried, so that a second ink layer with a thickness of about 2 μm was formed on the first ink layer. Thus, a thermal image transfer recording medium No. 9 according to the present invention with a structure as shown in FIG. 4 was obtained.

EXAMPLE 10

A support provided with a heat-resistant protective layer was prepared by the same method as in Example 1.

Formation of First Ink Layer

The following components were thoroughly dispersed in a ball mill at 30° C., and allowed to stand at room temperature, so that a composition of a thermofusible ink was prepared.

| | Parts by Weight |
|---|---|
| Carbon black | 2.5 |
| Candelilla wax | 7.6 |
| Polyethylene oxide wax | 2.5 |
| Terpene resin | 1.4 |
| Methyl ethyl ketone | 58.0 |
| Toluene | 28.0 |

A mixture of 80 parts by weight of the above-prepared composition of the thermofusible ink and 20 parts by weight of the same copolymer of vinyl chloride - vinyl acetate as in Example 9 was coated onto a surface of the above-prepared support, which was opposite to the heat-resistant protective layer and dried, so that a first ink layer with a thickness of about 8 μm was formed on the support.

Formation of Second Ink Layer

A mixture of 70 parts by weight of the same composition of the thermofusible ink as used in Example 4 and 30 parts by weight of the same composition of the microporous resin as in Example 5 was coated onto the above-prepared first ink layer and dried, so that a second ink layer with a thickness of about 2 μm was formed on the first ink layer. Thus, a thermal image transfer recording medium No. 10 according to the present invention with a structure as shown in FIG. 4 was obtained.

EXAMPLE 11

A support provided with a heat-resistant protective layer was prepared by the same method as in Example 1.

Formation of First Ink Layer

A mixture of 70 parts by weight of the same composition of the thermofusible ink as used in Example 4, 27 parts by weight of vinyl chloride - vinyl acetate copolymer with an average molecular weight of 20,000 and a glass transition temperature of 72° C., and 3 parts by weight of azobisisobutyronitrile was coated onto a surface of the above-prepared support, which was opposite to the heat-resistant protective layer and dried at 80° C., so that a first ink layer with a thickness of about 6 μm was formed on the support.

Formation of Second Ink Layer

A mixture of 70 parts by weight of the same composition of the thermofusible ink as used in Example 4 and 30 parts by weight of a 20% mixed solution (methyl ethyl ketone and toluene) of the resin capable of repelling a thermofusible ink as prepared in the above described Preparation Example was coated onto the above-prepared first ink layer and dried at 110° C. so that a second ink layer with a thickness of about 2 μm was formed on the first ink layer. Thus, a thermal image transfer recording medium No. 11 according to the present invention with a structure as shown in FIG. 4 was obtained.

EXAMPLE 12

A support provided with a heat-resistant protective layer was prepared by the same method as in Example 1.

Formation of First Ink Layer

A mixture of 80 parts by weight of the same composition of the thermofusible ink as used in Example 4 and 20 parts by weight of the same composition of the resin as in Example 13 was coated onto a surface of the above-prepared support, which was opposite to the heat-resistant protective layer and dried at 80° C., so that a first ink layer with a thickness of about 8 μm was formed on the support.

Formation of Second Ink Layer

A mixture of 70 parts by weight of the same composition of the thermofusible ink as used in Example 4 and 30 parts by weight of the same composition of the microporous resin as in Example 3 was coated onto the above-prepared first ink layer and dried at 110° C., so that a second ink layer with a thickness of about 2 μm was formed on the first ink layer. Thus, a thermal image transfer recording medium No. 12 according to the present invention with a structure as shown in FIG. 4 was obtained.

COMPARATIVE EXAMPLE 1

The procedure for preparation of the thermal image transfer recording medium No. 1 as employed in Example 1 was repeated except that a copolymer of vinyl chloride and vinyl acetate was used as a resin matrix of the ink layer, so that a comparative thermal image transfer recording medium No. 1 was obtained.

Each of the above-prepared thermal image transfer recording media Nos. 1 to 12 according to the present invention and comparative thermal image transfer recording medium No. 1 was placed in a line printer, and images were transferred four times to an image-receiving sheet from the same portion of the recording medium under the following conditions:

| | |
|---|---|
| Thermal head: | Line-type thin-film head |
| Platen pressure: | 230 gf/cm |
| Peeling angle against image-receiving sheet: | 45° |
| Energy applied from thermal head: | 23 $mJ/mm^2$ |
| Printing speed: | 2 inch/sec |
| Image-receiving sheet: | High quality paper having a Bekk's smoothness of 450 sec. |

The density of the images obtained at each printing operation was measured by a Macbeth densitometer RD-914. The results are shown in Table 1.

TABLE 1

| Recording Medium | Density of Images 1st | 2nd | 3rd | 4th |
|---|---|---|---|---|
| No. 1 | 1.42 | 1.25 | 1.16 | 0.98 |
| No. 2 | 1.34 | 1.27 | 1.19 | 1.05 |
| No. 3 | 1.37 | 1.18 | 1.05 | 0.86 |
| No. 4 | 1.12 | 1.16 | 1.11 | 0.94 |
| No. 5 | 1.42 | 1.33 | 1.16 | 1.05 |
| No. 6 | 1.34 | 1.27 | 1.19 | 1.09 |
| No. 7 | 1.37 | 1.18 | 1.09 | 0.98 |
| No. 8 | 1.42 | 1.41 | 1.34 | 1.13 |
| No. 9 | 1.43 | 1.40 | 1.32 | 1.09 |
| No. 10 | 1.12 | 1.16 | 1.11 | 0.94 |
| No. 11 | 1.23 | 1.25 | 1.21 | 1.09 |
| No. 12 | 1.36 | 1.44 | 1.38 | 1.21 |
| Comp. No. 1 | 1.38 | 0.15 | 0.15 | 0.15 |

As can be seen from the images obtained by the above thermal image test, the edge portions of images obtained in Example 1 were sharp and the noise caused by peeling off the image-receiving sheet was small as compared with the case in Comparative Example 1.

Furthermore, solid images were transferred to the image-receiving sheet using each recording medium, with the applied thermal energy increased. As a result, any of the ink layers of the recording media according to the present invention did not transfer to the image-receiving sheet. On the other hand, the ink layer of the comparative recording medium partially transferred to the image-receiving sheet.

The thermal image transfer recording medium according to the present invention can yield images with high density even when it is repeatedly used. Moreover, the ink layer never peel off the support at the first printing operation and the noise caused when the recording medium peels off the image-receiving sheet is remarkably small for the practical use.

What is claimed is:

1. A thermal image transfer recording medium comprising a support, and a thermofusible ink layer formed thereon, said thermofusible ink layer comprising a resin matrix and a thermofusible ink, at least one of said resin matrix or said thermofusible ink containing a repelling-property-imparting material such that said reins matrix and said thermofusible ink repel each other.

2. The thermal image transfer recording medium as claimed in claim 1, wherein said resin matrix comprises a resin and a repelling-property-imparting material capable of repelling said thermofusible ink.

3. The thermal image transfer recording medium as claimed in claim 1, wherein said thermofusible ink layer further comprises a repelling-property-imparting material capable of repelling said resin matrix.

4. The thermal image transfer recording medium as claimed in claim 2, wherein said repelling-property-imparting material is chemically bonded to said resin matrix to form a repelling site thereon.

5. The thermal image transfer recording medium as claimed in claim 3, wherein said repelling-property-imparting imparting material is a low-surface-energy repelling vehicle which is contained in said thermofusible ink layer.

6. The thermal image transfer recording medium as claimed in claim 2, wherein said resin in said resin matrix comprises is a vinyl chloride - vinyl acetate copolymer, and said repelling-property-imparting material for said resin matrix is selected from the group consisting of an acrylic acid ester, a methacrylic acid ester and copolymers thereof, which are grafted with polyorgano-dimethylsiloxane units.

7. The thermal image transfer recording medium as claimed in claim 1, further comprising an adhesive layer which is interposed between said support and said thermofusible ink layer.

8. A thermal image transfer recording medium comprising a support, and a thermofusible ink layer formed thereon, said thermofusible ink layer comprising a microporous resin matrix and a thermofusible ink, at least one of said microporous resin matrix or said thermofusible ink containing a repelling-property-imparting material such that said resin matrix and said thermofusible ink repel each other.

9. The thermal image transfer recording medium as claimed in claim 8, wherein said microporous resin matrix comprises a resin and a repelling-property-imparting material capable of repelling said thermofusible ink.

10. The thermal image transfer recording medium as claimed in claim 8, wherein said thermofusible ink layer further comprises a repelling-property-imparting material capable of repelling said microporous resin matrix.

11. The thermal image transfer recording medium as claimed in claim 9, wherein said repelling-property-imparting material is chemically bonded to said minuteporous resin matrix to form a repelling site thereon.

12. The thermal image transfer recording medium as claimed in claim 10, wherein said repelling-property-imparting material is a low-surface-energy repelling vehicle which is contained in said thermofusible ink layer.

13. The thermal image transfer recording medium as claimed in claim 9, wherein said resin in said microporous resin matrix comprises is a vinyl chloride - vinyl acetate copolymer, and said repelling-property-imparting material for said microporous resin matrix is selected from the group consisting of an acrylic acid ester, a methacrylic acid ester and copolymers thereof, which are grafter with polyorgano-dimethylsiloxane units.

14. The thermal image transfer recording medium as claimed in claim 8, further comprising an adhesive layer which is interposed between said support and said thermofusible ink layer.

15. A thermal image transfer recording medium comprising a support, and a thermofusible ink layer formed thereon, which comprises a resin matrix and a thermofusible ink, in which the amount of said resin matrix increases in the direction of the thickness of said thermofusible ink layer toward the outer surface thereof, and the amount of said thermofusible ink decreases in the direction of the thickness of said thermofusible ink layer toward the outer surface thereof, at least one of said resin matrix or said thermofusible ink containing a repelling-property-imparting material such that said resin matrix and said thermofusible ink repel each other.

16. The thermal image transfer recording medium as claimed in claim 15, wherein said resin matrix comprises a resin and a repelling-property-imparting material capable of repelling said thermofusible ink.

17. The thermal image transfer recording medium as claimed in claim 15, wherein said thermofusible ink layer further comprises a repelling-property-imparting material capable of repelling said resin matrix.

18. The thermal image transfer recording medium as claimed in claim 16, wherein said repelling-property-imparting material is chemically bonded to said resin matrix to form a repelling site thereon.

19. The thermal image transfer recording medium as claimed in claim 17, wherein said repelling-property-imparting material is a low-surface-energy repelling vehicle which is contained in said thermofusible ink layer.

20. The thermal image transfer recording medium as claimed in claim 16, wherein said resin in said resin matrix comprises is a vinyl chloride - vinyl acetate copolymer, and said repelling-property-imparting material for said resin matrix is selected from the group consisting of an acrylic acid ester, a methacrylic acid ester and copolymers thereof, which are grafted with polyorgano-dimethylsiloxane units.

21. The thermal image transfer recording medium as claimed in claim 15, further comprising an adhesive layer which is interposed between said support and said thermofusible ink layer.

22. A thermal image transfer recording medium comprising a support, and a thermofusible ink layer formed thereon, which comprises a first thermofusible ink layer and a second thermofusible ink layer which is overlaid on said first thermofusible ink layer, said first thermofusible ink layer comprising a resin matrix with a three-dimensionally extended, coarsely branched structure and a thermofusible ink, said second thermofusible ink layer comprising a microporous resin matrix and said thermofusible ink, at least one of said microporous resin matrix or said thermofusible ink containing a repelling-property-imparting material such that said resin matrix and said thermofusible ink repel each other.

23. The thermal image transfer recording medium as claimed in claim 22, wherein said microporous resin matrix comprises a resin and a repelling-property-imparting material capable of repelling said thermofusible ink.

24. The thermal image transfer recording medium as claimed in claim 22, wherein said thermofusible ink layer further comprises a repelling-property-imparting material capable of repelling said microporous resin matrix.

25. The thermal image transfer recording medium as claimed in claim 23, wherein said repelling-property-imparting material is chemically bonded at least to said microporous resin matrix to form a repelling site thereon.

26. The thermal image transfer recording medium as claimed in claim 24, wherein said repelling-property-imparting material is a low-surface-energy repelling vehicle which is contained in said thermofusible ink layer.

27. The thermal image transfer recording medium as claimed in claim 23, wherein said resin in said microporous resin matrix comprises is a vinyl chloride - vinyl acetate copolymer, and said repelling-property-imparting material for said microporous resin matrix is selected from the group consisting of an acrylic acid ester, a methacrylic acid ester and copolymers thereof, which are grafted with polyorgano-dimethylsiloxane units.

28. The thermal image transfer recording medium as claimed in claim 22, further comprising an adhesive layer which is interposed between said support and said thermofusible ink layer.

* * * * *

UNITED STATES PATENT AND TRADEMARK OFFICE

CERTIFICATE OF CORRECTION

PATENT NO. : 5,328,747

DATED : July 12, 1994

INVENTOR(S) : YOUJI IDE ET AL

It is certified that error appears in the above-identified patent and that said Letters Patent is hereby corrected as shown below:

| Col. | Line | |
|---|---|---|
| 7, | 54, | please delete "190:10" and insert --(90:10)--. |
| 9, | 46, | please insert --.-- after "prepared". |
| 14, | 47, | please insert --transfer-- after "image". |
| 15, | 68, | please delete "grafter" and insert --grafted--. |

Signed and Sealed this

Twenty-sixth Day of September, 1995

Attest:

BRUCE LEHMAN

*Attesting Officer*

*Commissioner of Patents and Trademarks*